P. N. Jacobus,
Shears.
No. 88,172.  Patented Mar. 23, 1869.
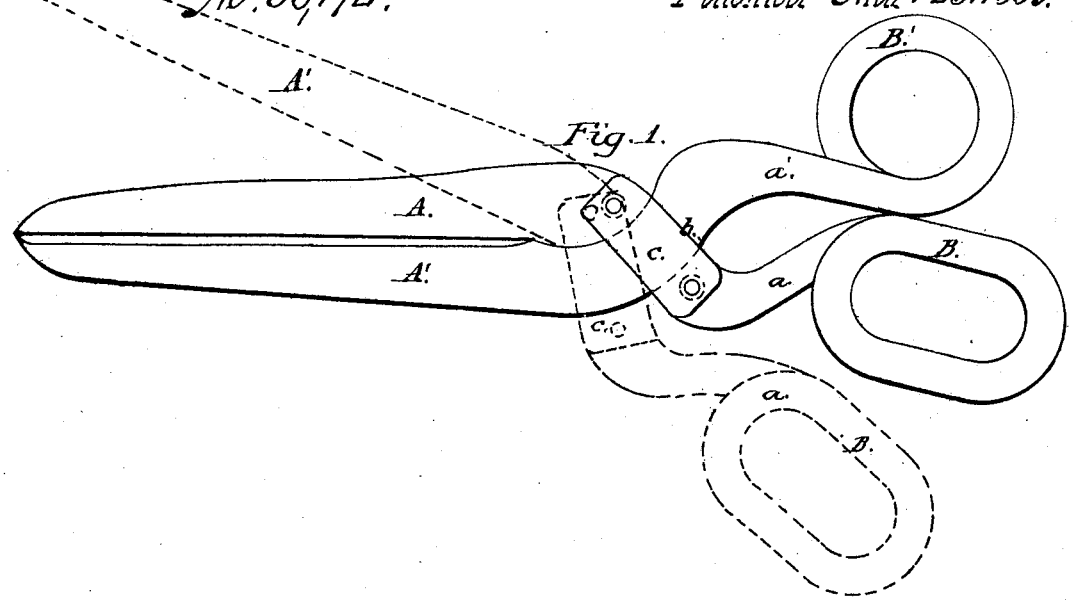
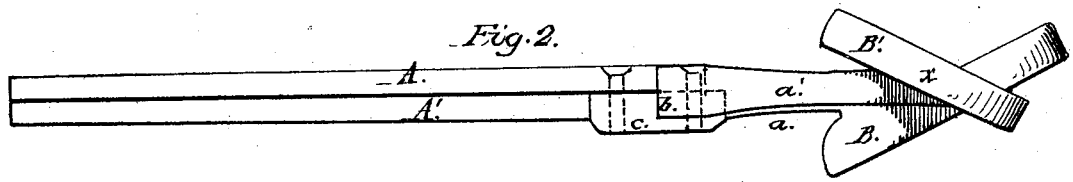
Witnesses:
J. W. Coombs
Fred. Haynes
Inventor:
P. N. Jacobus
Per Brown Coombs & Co.
Atty.

P. N. JACOBUS, OF FLATBROOKVILLE, NEW JERSEY.

Letters Patent No. 88,172, dated March 23, 1869.

IMPROVEMENT IN SHEARS.

The Schedule referred to in these Letters Patent and making part of the same.

*To all whom it may concern:*

Be it known that I, P. N. JACOBUS, of Flatbrookville, in the county of Sussex, and State of New Jersey, have invented a new and useful Improvement in Shears, of which the following is a full, clear, and exact description, reference being had to the accompanying drawing, forming part of this specification, and in which—

Figure 1 represents a side view of a pair of scissors or shears, constructed in accordance with my improvement, and Figure 2, an edge view of the same.

Similar letters of reference indicate corresponding parts.

My invention consists—

First, in a novel manner of connecting, or uniting for action, the two blades of the shears, whereby rivets or pivots for the blades to work upon or by, as a centre or centres of motion, are dispensed with, and a curvilinear sliding action and drawing-cut are secured.

Secondly, the invention consists in a novel arrangement of the bows, or loops to the handles of the shears, whereby an easier and more natural disposition of the fingers, in their hold or grasp of the handles, is obtained.

Referring to the accompanying drawing,

A A′ represent the upper and lower blades of a pair of scissors or shears.

Said blades, though arranged to cross each other where they are extended to form handles $a$ $a'$, are not riveted or pivoted together, to play as upon a fulcrum, but the one blade, A, is struck of a suitable curve, or sweep, in its rear, or where it joins its handle, to form a curvilinear guiding portion, $b$, to the other blade A′, in such manner as to admit not only of an opening and closing-action of the latter blade (A′) upon said curved portion $b$, but also of a curvilinear sliding action thereon, by means of a strap, clip, or slotted formation $c$, on the blade A′, arranged to freely receive through it the curved portion $b$ of the other blade.

This sliding bearing, or portion $c$, may either be a part and parcel of the blade which carries it, or it may be a separate piece attached thereto by screws, or in any other suitable manner, and it may either be of the same or different metal to the blade or blades.

By this junction of the blades, I get a draw-cut without any compound-lever connections, but simply by a curvilinear sliding action of the one blade on, as it were, or relatively to the other.

This is illustrated in fig. 1 of the drawing, wherein A′ is supposed to be the lower blade, resting on the cutting-board, or stand, while the other blade, A, in being closed from its position, shown in red lines, to that indicated by black lines, is made to have a backward draw on or up the curved portion $b$ of the other blade, which prevents the pushing away, or forward, by the angular action of the closing-blade, the material being cut.

The cutting-angle, formed by the inner, or back ends of the blades, is also, by this specified junction of the latter, less obtuse, and more favorable, in closing, to the shears; and by properly shaping the cutting-edges throughout the length of the blades, the cutting-angle may be made uniform, or nearly so, throughout the entire closing-action of the shears.

The bows, or loops, B B′, to the back ends of the handles, are peculiarly set or arranged. Thus, they are not merely bent, or set outwards, in reverse directions to each other, but are made to cross, in opposite directions, the lines of the handles, as if, for instance, turned or twisted from an intermediate centre, $x$, so that each bow projects at its ends beyond the opposite sides of the handle to which it belongs. This diagonal disposition of the bows, or loops, admits of an easier and more natural disposition of the fingers in their hold, or grasp of the handles, retaining to the fingers the same or like relative positions they assume in merely closing to the hand. This facilitates, or makes less laborious the working of the shears.

What is here claimed, and desired to be secured by Letters Patent is—

1. The slot $c$, formed in the part A of the shears, in combination with the curvilinear portion $b$ of the part A′, substantially as and for the purpose set forth.

2. The arrangement of the bows, or loops to the handles of a pair of scissors or shears, in such manner as that either bow, or loop lies diagonally across the handle to which it belongs; and, where both loops are so twisted or set, the same made to occupy reverse positions relatively to each other, substantially as shown and described.

P. N. JACOBUS.

Witnesses:
 MARTIN HULL,
 OBADIAH FULLER.